(12) United States Patent
Uradnisheck (10) Patent No.: US 8,182,734 B1
(45) Date of Patent: May 22, 2012

(54) THERMOFORMED ARTICLES AND COMPOSITIONS OF POLY(HYDROXYALKANOIC ACID) AND POLYOXYMETHYLENE

(75) Inventor: Julius Uradnisheck, Glen Mills, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/482,971

(22) Filed: Jun. 11, 2009

Related U.S. Application Data (63) Continuation-in-part of application No. 11/894,103, filed on Aug. 20, 2007, now abandoned.

(51) Int. Cl.
*B29C 59/02* (2006.01)

(52) U.S. Cl. ........ 264/320; 264/544; 264/553; 525/400; 525/410; 525/414; 525/415; 525/450

(58) Field of Classification Search ............... 525/415, 525/450, 400, 410, 414; 264/320, 544, 553
See application file for complete search history.

(56) References Cited

U.S. PATENT DOCUMENTS

| | | |
|---|---|---|
| 3,264,272 A | 8/1966 | Rees |
| 4,044,086 A | 8/1977 | McChesney |
| 4,187,358 A | 2/1980 | Kyo |
| 4,753,980 A | 6/1988 | Deyrup |
| 4,912,167 A | 3/1990 | Deyrup |
| 5,883,199 A | 3/1999 | McCarthy |
| 6,235,825 B1 | 5/2001 | Yoshida |
| 6,323,308 B1 | 11/2001 | Kobayashi |
| 6,713,175 B1 | 3/2004 | Terada |
| 6,756,331 B2 | 6/2004 | Kitahara |
| 6,943,214 B2 | 9/2005 | Flexman |
| 6,960,374 B1 | 11/2005 | Terada et al. |
| 7,078,368 B2 | 7/2006 | Laney |
| 7,354,973 B2 | 4/2008 | Flexman |
| 7,381,772 B2 | 6/2008 | Flexman |
| 2003/0038405 A1* | 2/2003 | Bopp et al. ............ 264/319 |
| 2004/0242803 A1* | 12/2004 | Ohme et al. ............ 525/400 |
| 2005/0131120 A1 | 6/2005 | Flexman |
| 2005/0151296 A1 | 7/2005 | Obuchi |
| 2005/0256268 A1 | 11/2005 | Chen |
| 2006/0142505 A1 | 6/2006 | Umemoto |
| 2006/0173133 A1 | 8/2006 | Flexman |
| 2007/0213466 A1 | 9/2007 | Uradnisheck |

FOREIGN PATENT DOCUMENTS

| | | |
|---|---|---|
| EP | 0980894 A1 | 6/2009 |
| JP | 9316310 A1 | 12/1997 |
| JP | 10-193495 A1 | 7/1998 |
| WO | 03014224 A1 | 2/2003 |
| WO | 03082980 A1 | 10/2003 |
| WO | 2004101642 A1 | 11/2004 |
| WO | 2005/059031 A1 | 6/2005 |

* cited by examiner

*Primary Examiner* — David W Wu
*Assistant Examiner* — Robert Jones, Jr.
(74) *Attorney, Agent, or Firm* — Lucas K. Shay (57) ABSTRACT

Disclosed are poly(hydroxyalkanoic acid) resin compositions comprising poly(hydroxyalkanoic acid), such as polylactic acid, and a polyoxymethylene. Also disclosed are articles such as films, sheets and thermoformed containers comprising the compositions.

19 Claims, 1 Drawing Sheet

US 8,182,734 B1

THERMOFORMED ARTICLES AND COMPOSITIONS OF POLY(HYDROXYALKANOIC ACID) AND POLYOXYMETHYLENE

The invention relates to thermoplastic poly(hydroxyalkanoic acid) compositions modified with a polyoxymethylene polymer and to thermoformed articles prepared from the compositions.

BACKGROUND OF THE INVENTION

Poly(hydroxyalkanoic acid) (PHA) polymers such as poly (lactic acid) (PLA) can be polymerized from renewable sources rather than petroleum and are compostable. They have a broad range of industrial and biomedical applications. However, physical limitations such as brittleness and slow crystallization may prevent easy thermoforming of PHAs into articles that have an acceptable degree of toughness and thermal stability for many applications. Extruded amorphous sheeting may also be too brittle for handling in continuous moving equipment without breakage.

To make thermoformed articles, a PHA resin, such as PLA, is first extruded into an amorphous sheet and then formed at an optimal temperature and speed into a semicrystalline container such as a cup. The thermoforming speed and sheet-forming temperatures are optimized for a specific cup design. High sheet-forming pre-heat temperatures can cause the pre-formed sheet to deflect and fall before being formed. Too low a forming temperature can give a sheet of high stiffness that is unable to be physically formed into a deep cup. High thermoforming speeds can rupture the sheet before it achieves the shape of the cup. Too low a forming speed can allow the cup to begin crystallizing during forming, which can lead to unacceptable haze or can result in the cup not achieving the full depth of formation.

The narrowest operating window of temperature and forming speed is for cups having the greatest degree of formation, such as cups with high height-to-diameter ratios. At forming speeds and temperatures useful for large-scale manufacturing of thermoformed articles, thermoformed articles of non-modified PLA may not have high use-temperatures because the formed article may have regions that are incompletely crystallized. Such cups may be more highly crystalline in those regions that were oriented during forming, such as the walls, and of lower or no crystallinity in those regions having low degrees of orientation, such as the base or rim. Because nonmodified PLA is often slow to crystallize, the resin in the resulting cup that is thermoformed at practical high speeds may not be everywhere fully crystallized. The regions not fully crystallized may either soften at the glass transition temperature (Tg) or may experience slow crystallization and subsequent shrinkage when exposed to higher temperatures. Since nonmodified PLA typically has a Tg of around 55° C., the use-temperature of the cup is limited to about 55° C. This is undesirably low because the containers may experience temperatures of 65° C. or more during normal shipping and handling. In addition, hot-filling of containers is typically carried out at about 80° C. or above. The PLA cups that are not fully crystallized may also deform and stick together at temperatures above the Tg.

The use-temperature of thermoformed articles can be raised by annealing the articles in their molds. Annealing is carried out most effectively at temperatures between the Tg and the melting range of the resin composition, allowing the composition to crystallize. Annealing would greatly increase the cost for making cups of nonmodified PLA by increasing cycle time, decreasing throughput and through higher energy costs associated with the annealing.

It is desirable to obtain toughened PHAs that are easily thermoformed into a variety of articles with an acceptable level of thermal stability, preferably without the need for annealing. Modification of the PHAs by addition of other resin materials may improve toughness and crystallization rates during thermoforming.

Patent Applications US200410242803 and WO03/014224 disclose miscible blends of poly(lactic acid) with polyacetal resin that may contain impact modifiers. U.S. Pat. No. 6,943,214 discloses blends of polylactic acid and polyoxymethylene toughened with random ethylene copolymers comprising glycidyl groups.

SUMMARY OF THE INVENTION

An article comprises a composition wherein

The composition comprises or is produced from poly(hydroxyalkanoic acid) (PHA) and 0.1 up to 9 weight % of a polyoxymethylene resin (POM), based on the total amount of the composition;

the article is thermoformed article; and the composition has a glass transition temperature (in ° C.), that is within 10%, 7%, 5%, 4%, 3%, or 2%, of the glass transition temperature of the PHA (i.e., PHA without POM) for every 1 weight % of polyoxymethylene present in the composition.

The invention also provides a poly(hydroxyalkanoic acid) composition comprising (i) PHA and (ii) from 0.1 to 0.9 weight % of a POM, based on the total weight of the composition.

A process comprises compounding a composition to form a film or sheet; thermoforming the film or sheet in a mold to form a shaped article; and quenching the article wherein the composition is as disclosed above.

DETAILED DESCRIPTION OF THE INVENTION

Figure 1:
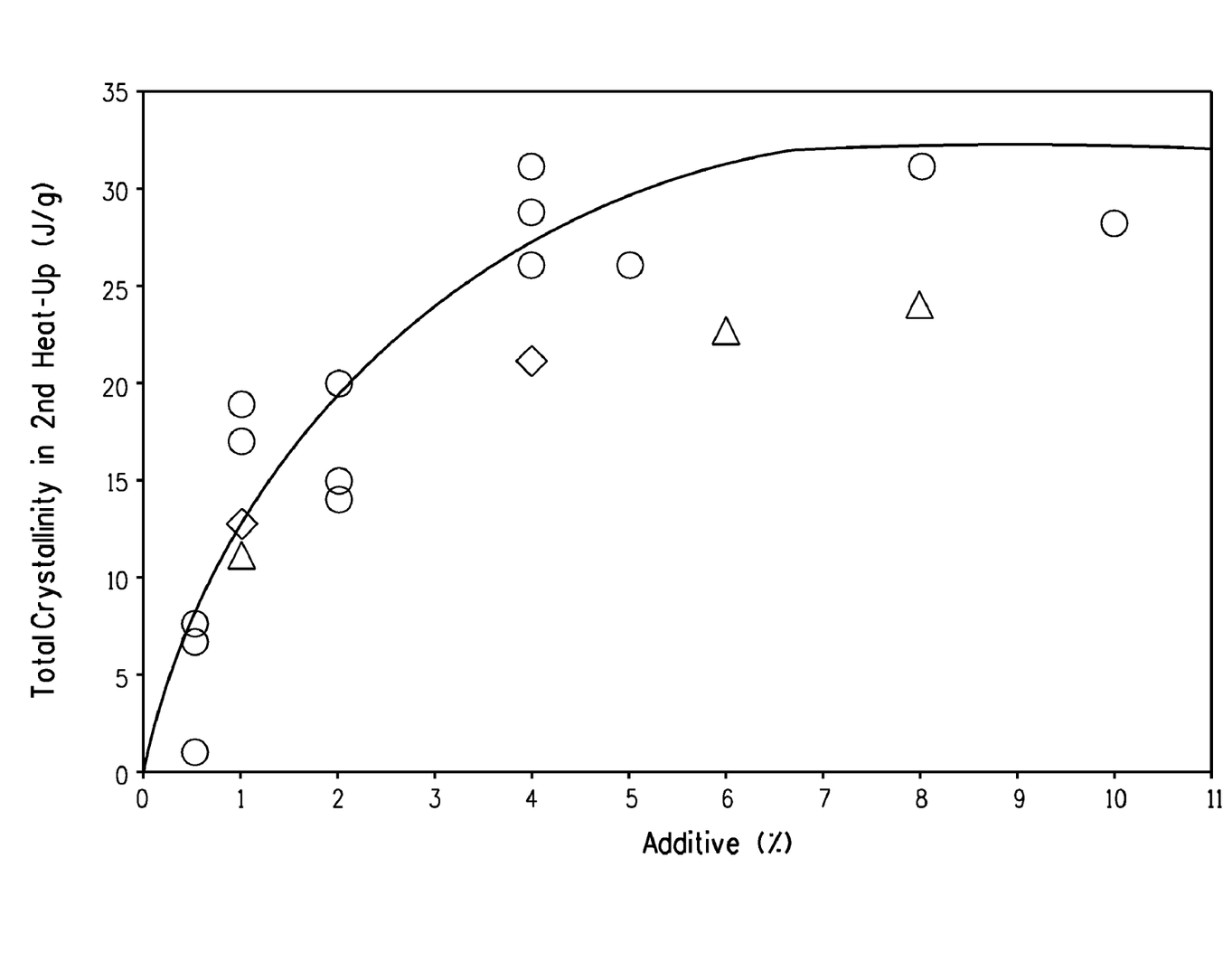
The FIGURE is a plot of the crystallinity of the composition during the second heat-up versus the concentration of POM additive in the composition.

All references disclosed herein are incorporated by reference.

A thermoformed or oriented article disclosed has less than 5%, <3%, or <2% haze, measured at 10 to 13 mil thickness using ASTM D1003-REV92 and/or <15%, <10%, <5%, or even <1% shrinkage when the article is heated to 60° C. for at least 2 seconds.

Unless stated otherwise, all percentages, parts and ratios, are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

Copolymer refers to polymers comprising copolymerized units resulting from copolymerization of two or more comonomers, including polymers comprising different stereoisomers such as L-lactide and D-lactide. In this connection, a copolymer may be described herein with reference to its constituent comonomers or to the amounts of its constituent comonomers, for example "a copolymer comprising L-lactide and 15 weight % of D-lactide", or a similar description. Such a description may be considered informal in that it does not refer to the comonomers as copolymerized units; in that it does not include a conventional nomenclature for the copolymer, for example International Union of Pure and Applied Chemistry nomenclature; in that it does not use product-by-process terminology; or for another reason. However, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

PHA can comprise from 0 to 50, 1 to 30, 1 to 20, 1 to 10, or 1 to 7 weight % of D-isomers.

Compostable polymers are those that are degradable or disintegrate into microscopic or smaller particles under composting conditions. They break down under the conditions induced by the action of organisms (annelids) and microorganisms (bacteria, fungi, algae), achieve total mineralization (conversion into carbon dioxide, methane, water, inorganic compounds or biomass under aerobic conditions) at a high rate and are compatible with the composting process.

Renewable polymers are those that comprise or are prepared from raw materials or starting materials that are or can be replenished sooner than within a few years (unlike petroleum which requires thousands or millions of years), such as by fermentation and other processes that convert biological materials into feedstock or into the final renewable polymer.

PHA polymers such as PLA are usually compostable polymers. A number of these are also available from processing renewable resources, such as production by bacterial fermentation processes or isolated from plant matter that include corn, sweet potatoes, and the like. Thus, poly(hydroxyalkanoic acid) polymers are becoming increasingly desirable for production of a wider variety of articles.

PHA compositions include polymers prepared from polymerization of hydroxyalkanoic acids having from 2 to 7 (or more) carbon atoms, including the polymer comprising 6-hydroxyhexanoic acid, also known as polycaprolactone (PCL), and polymers comprising 3-hydroxyhexanoic acid, 4-hydroxyhexanoic acid and 3-hydroxyheptanoic acid. Of note are poly(hydroxyalkanoic acid) comprising hydroxyalkanoic acids having five or fewer carbon atoms, for example, polymers comprising glycolic acid, lactic acid, 3-hydroxypropionate, 2-hydroxybutyrate, 3-hydroxybutyrate, 4-hydroxybutyrate, 3-hydroxyvalerate, 4-hydroxyvalerate and 5-hydroxyvalerate. Notable polymers include poly(glycolic acid) (PGA), PLA, and poly(hydroxybutyrate) (PHB). PHA compositions also include blends of two or more PHA polymers, such as a blend of PHB and PCL.

PHA polymers can be produced by bulk polymerization. A PHA may be synthesized through the dehydration-polycondensation of the hydroxyalkanoic acid. A PHA may also be synthesized through the dealcoholization-polycondensation of an alkyl ester of PGA or by ring-opening polymerization (ROP) of a cyclic derivative such as the corresponding lactone or cyclic dimeric ester. The bulk polymerization is usually carried out by two production processes, i.e., a continuous process and a batch process. Japanese Patent Laid-Open No. (JP-A) 03-502115 discloses a process wherein bulk polymerization of cyclic esters is carried out in a twin-screw extruder. JP-A 07-26001 discloses a process for the polymerization of biodegradable polymers, wherein a bimolecular cyclic ester of hydroxycarboxylic acid and one or more lactones are continuously fed to a continuous reaction apparatus having a static mixer for ROP. JP-A 07-53684 discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader. U.S. Pat. No. 2,668,162 and U.S. Pat. No. 3,297,033 disclose batch processes.

PHA polymers also include copolymers comprising more than one PHA, such as polyhydroxybutyrate-hydroxyvalerate (PHBN) copolymers and copolymers of glycolic acid and lactic acid (PGA/LA). Copolymers can be prepared by catalyzed copolymerization of a polyhydroxyalkanoic acid or derivative with one or more cyclic esters and/or dimeric cyclic esters. Such comonomers include glycolide (1,4-dioxane-2,5-dione), the dimeric cyclic ester of glycolic acid; lactide (3,6-dimethyl-1,4-dioxane-2,5-dione); α,α-dimethyl-β-propiolactone, the cyclic ester of 2,2-dimethyl-3-hydroxy-propanoic acid; β-butyrolactone, the cyclic ester of 3-hydroxy-butyric acid, δ-valerolactone, the cyclic ester of 5-hydroxypentanoic acid; ε-capro-lactone, the cyclic ester of 6-hydroxyhexanoic acid, and the lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., the cyclic ester of 12-hydroxy-dodecanoic acid, and 2-p-dioxanone, and the cyclic ester of 2-(2-hydroxyethyl)-glycolic acid.

PHA compositions also include copolymers of one or more PHA monomers or derivatives with other comonomers, including aliphatic and aromatic diacid and diol monomers such as succinic acid, adipic acid, and terephthalic acid and ethylene glycol, 1,3-propanediol, and 1,4-butanediol. Around 100 different monomers have been incorporated into PHA polymers.

Some PHA polymers and copolymers may also be made by living organisms or isolated from plant matter. Numerous microorganisms have the ability to accumulate intracellular reserves of PHA polymers. For example, the copolymer poly (3-hydroxybutyrate-co-3-hydroxyvalerate) (PHB/V) has been produced by fermentation of the bacterium *Ralstonia eutropha*. Fermentation and recovery processes for other PHA types have also been developed using a range of bacteria including *Azotobacter, Alcaligenes latus, Comamonas* testosterone and genetically engineered *E. coli* and *Klebsiella*. U.S. Pat. No. 6,323,010 discloses a number of PHA copolymers prepared from genetically modified organisms.

When used herein, poly(hydroxyalkanoic acid) or PHA refers to a polymer or composition comprising any homopolymer or copolymer comprising a hydroxyalkanoic acid and mixtures thereof, such as those homopolymers, copolymers and blends listed above. Likewise, when a specific hydroxyalkanoic acid is used in such a term, such as PGA, PLA, or PHB, the term includes homopolymers, copolymers or blends comprising the hydroxyalkanoic acid used in the term.

PLA includes poly(lactic acid) homopolymers and copolymers of lactic acid and other monomers containing at least 50 mole % of repeat units derived from lactic acid or its derivatives and mixtures thereof having a number average molecular weight of 3,000 to 1,000,000, 10,000 to 700,000, or 20,000 to 600,000. PLA may contain at least 70 mole % of repeat units derived from (e.g. made from) lactic acid or its derivatives. The poly(lactic acid) homopolymers and copolymers can be derived from D-lactic acid, L-lactic acid, or a mixture thereof. A mixture of two or more poly(lactic acid) polymers can be used. Poly(lactic acid) may be prepared by the catalyzed ring-opening polymerization of the dimeric cyclic ester of lactic acid, which is referred to as "lactide." As a result, poly(lactic acid) is also referred to as "polylactide."

Copolymers of lactic acid are typically prepared by catalyzed copolymerization of lactic acid, lactide or another lactic acid derivative with one or more cyclic esters and/or dimeric cyclic esters as described above.

PLA is a rigid thermoplastic polymer that can be semicrystalline or totally amorphous depending on the stereopurity of the polymer backbone. L(−)-lactic acid (2-hydroxy propionic acid) is the natural and most common form of the acid, but D(+)-lactic acid can also be produced by microorganisms or through racemization. The D-enantiomer acts much like comonomers in other polymers such as polyethylene terephthalate (PET) or polyethylene. In PET, diethylene glycol or isophthalic acid is copolymerized into the backbone at low levels (1-10%) to control the rate of crystallization. In the same way, D-lactic acid units are incorporated into L-PLA to optimize the crystallization kinetics for specific fabrication processes and applications.

For strictly PLA linear optical copolymers, there are several primary structures which lead to a variety of highly ordered crystalline structures. The simplest is that of the isotactic homopolymer poly(L-lactide) (PLLA) or its opposite enantiomer poly(D-lactide) (PDLA) where all of the monomers in the chain are of the same optical composition. More research has been done on PLLA because the commercial production of lactic acid has been predominantly L-lactic acid. The crystal structure of PLLA homopolymer exists in $\alpha$ and $\beta$ forms.

The most common commercial polymers of PLA are optical copolymers of predominantly L-lactide, with small amounts of D- and meso-lactides, made through bulk polymerization with tin octoate catalyst via ROP. Commercial polymers of PLA have melting points ranging from about 192° C. for an isotactic polymer of L-lactic acid to about 132° C. for a polymer containing about 9 mole % of D-lactic acid.

The PHA may comprise up to about 99.9 weight % of the composition, based on the total amount of PHA and modifier in the composition. For example, the PHA may be present in a range from a lower limit of 91 or 95 to an upper limit of 97, 98, 99, 99.1, 99.5 or 99.9 weight %.

The POM concentration in the composition can be in the range of 0.1 to 9, 0.1 to 8, 0.1 to 7, 0.1 to 6, 0.1 to 5, 0.1 to 4, 0.1 to 3, 0.1 to 2, 0.1 to 0.9, or 1 to 5, weight % of the composition.

Polyoxymethylene (POM) is a polymer whose physical properties include excellent tribology, hardness, moderate toughness and the ability to crystallize rapidly. Polyoxymethylene is also known as polyacetal. The POM can be one or more homopolymers, copolymers, or a mixture thereof. These resins may be produced using any known method.

Homopolymers are prepared by polymerizing formaldehyde or formaldehyde equivalents, such as cyclic oligomers of formaldehyde, including trioxane. For example, POM homopolymer can be produced by polymerizing high-purity formaldehyde in an organic solvent that contains a basic polymerization catalyst such as an organic amine, an organic or inorganic tin compound or a metal hydroxide, removing the resulting polymer by filtration, and then acetylating the polymer terminals under heat in acetic anhydride in the presence of sodium acetate.

Copolymers can contain one or more comonomers generally used in preparing P compositions. Commonly used comonomers include acetals and cyclic ethers that lead to the incorporation into the polymer chain of ether units with from 2 to 12 sequential carbon atoms. If a copolymer is selected, the quantity of comonomer may not be more than 20 weight %, preferably not more than 15 weight %, and most preferably about two weight %. Preferred comonomers include 1,3 dioxolane, ethylene oxide, and butylene oxide, where 1,3-dioxolane is more preferred, and preferred POM copolymers are copolymers where the quantity of comonomer is about 2 weight percent.

Example copolymers include a POM copolymer that contains at most 2 weight % of oxyalkylene units with 2 neighboring carbon atoms in the backbone chain or a POM copolymer that contains at most 5 weight % of oxyalkylene units with 4 neighboring carbon atoms in the backbone chain; a POM copolymer that contains from 0.2 to 1.4 weight % of oxyalkylene units with 2 neighboring carbon atoms in the backbone chain or a POM copolymer that contains from 0.5 to 3 weight % of oxyalkylene units with 4 neighboring carbon atoms in the main chain.

A POM copolymer can be produced by introducing a high-purity trioxane and a copolymerizing component such as ethylene oxide or 1,3-dioxolane into an organic solvent such as cyclohexane, then subjecting them to cationic polymerization in the presence of a Lewis acid catalyst such as boron trifluoride-diethyl ether complex, then inactivating the catalyst and stabilizing the terminal group of the resulting copolymer; or introducing trioxane, the copolymerizing component and the catalyst in a self-cleaning stirrer with no solvent therein, subjecting them into bulk polymerization, and thereafter decomposing and removing the unstable terminals.

It is preferred that the homo- and copolymers are: 1) homopolymers whose terminal hydroxy groups are end-capped by a chemical reaction to form ester or ether groups; or 2) copolymers that are not completely end-capped, but that have some free hydroxy ends from the comonomer unit or are terminated with ether groups. Preferred end groups for homopolymers are acetate and methoxy and preferred end groups for copolymers are hydroxy and methoxy.

The POMs can be branched or linear and may generally have a number average molecular weight in the range of 10,000-150,000, preferably 20,000-90,000, and more preferably 25,000-70,000. The molecular weight can be conveniently measured by gel permeation chromatography in m-cresol at 160° C. using a DuPont PSM bimodal column kit with nominal pore sizes of 60 and 1000 Å. The average molecular weight can also be determined by measuring the melt flow rate using ASTM D1238 or ISO 1133. The melt flow may be in the range of about 0.1 to about 100 g/min, preferably from about 0.5 to about 60 g/min, or more preferably from about 0.8 to about 40 g/min. for thermoforming purposes.

The compositions may also optionally further comprise other additives such as about 0.5 to about 5 weight % plasticizer; about 0.1 to about 5 weight % antioxidants and stabilizers; about 3 to about 40 weight % fillers; about 5 to about 40 weight % reinforcing agents; about 0.5 to about 10 weight % nanocomposite reinforcing agents; and/or about 1 to about 40 weight % flame retardants. Examples of suitable fillers include glass fibers and minerals such as precipitated $CaCO_3$, talc, and wollastonite. When such additives are used, the amount of additive is in addition to the amounts of PHA and POM in the composition.

The compositions can be prepared by melt blending the PHA and POM until they are homogeneously dispersed to the naked eye and do not delaminate upon extrusion. Other materials (e.g. additives) may be also uniformly dispersed in the PHA-POM matrix. The blend may be obtained by combining the component materials using any melt-mixing method known in the art. For example: 1) the component materials may be mixed to homogeneity using a melt-mixer such as a single or twin-screw extruder, blender, kneader, Banbury mixer, roll mixer, etc., to give a resin composition; or 2) a portion of the component materials can be mixed in a melt-mixer, and the rest of the component materials subsequently added and further melt-mixed until homogeneous.

The composition may have a glass transition temperature that is within, or less than 10%, 7.5%, 5%, 4%, 3%, or 2%, of the glass transition temperature in ° C. of the poly(hydroxyalkanoic acid) for every 1 weight of POM presence in the composition.

The compositions may be formed into films or sheets by extrusion through either slot dies to prepare cast films or sheets or annular dies to prepare blown films or sheets. These sheets may be thermoformed into articles and structures that are oriented in line from the melt or at a later stage in the processing of the composition.

Portions of thermoformed articles can be oriented by aligning polymer molecules in the direction of the greatest stretch to help crystallization speed and dimensional stability of the articles above the Tg. Stretch can be uniaxially or biaxially. For example the walls of a tall cup may be more uniaxially stretched whereas the base may be biaxially stretched during the process of forming into a mold.

A thermoforming apparatus can be any thermoforming tools known to one skilled in the art and can have any shapes desired such as cup, jar, vial, bowl, bag, lid, or bottle.

Before thermoforming an amorphous or nearly amorphous film or sheet is formed by extrusion of the PHA composition as a melt onto a cool surface such as a rotating "quench drum". The film or sheet thickness may range from about 2 mils to 90 mils. The thicker sheet requires cooler quench drums in order to cool the entire thickness of the sheet at a rate faster than the crystallization rate. Also before thermoforming, the film or sheet can be pre-heated to the thermoforming temperature such as 90 to 200° C.; the optimal temperature usually being about halfway between Tg and the melt point of the PHA or 5° C. higher or lower than the about half way between Tg and the melt point of the PHA. Too low a pre-heat temperature may produce a sheet that has too high a modulus for thermoforming and may not fill the mold. Too high a temperature may produce a sheet that may droop too much or far by gravity out of the molding machine. An optimal temperature may provide the best balance of modulus as well as fastest crystallization speeds. The pre-heating time heated to the thermoformed temperature may play a role as too short a time may produce too high a modulus sheet because the sheet is not completely heated through its thickness and, on the other hand, too long a time may produce too high a modulus but for the reason of the development of crystallinity in the sheet during its time in the heater. The pre-heating time can be 5 to 200, 10 to 100, or 20 to 60 seconds. The time period for thermoforming can be 0.1 to 30, 0.1 to 20, 0.5 to 10, or 0.5 to 6 seconds. After thermoforming, the article can be quenched, using for example water or any other cooling means to below 50° C., 40° C., 40° C., or 30° C. It is preferably that the article be fast-quenched, i.e., quenched to desired temperature in less than about 20, 10, 5, or even 1, minutes. The article can then be was then removed from the apparatus. Alternatively, the article can be held in the thermoforming mold for additional 1 to 20, 1 to 10, 1 to 6, or 0.5 to 6 seconds before being moved from the mold.

Because an article made from the composition develops crystallinity during the process of forming into the mold, the article is dimensionally stable.

Of note are thermoformed or oriented articles having less than 5%, preferably less than 2%, haze, measured at 10 to 13 mil thickness using ASTM D1003-REV92. Also of note are thermoformed or oriented articles having less than 10% shrinkage when heated to 60° C. for at least 2 seconds.

Examples of articles that may be formed from the compositions include thermoformable sheeting and the like. Films and sheets can be used to prepare packaging materials and containers such as pouches, lidding, and thermoformed containers such as trays, cups, and bowls. Other thermoformed packaging articles include blister packaging, blister components or pharmaceutical compartments for dispensers, clam shells, handling-trays, point-of-purchase display stands, two-pieces boxes (lid and base combinations), dispenser bodies, bifoldable articles, and the like.

The following Examples are merely illustrative, and are not to be construed as limiting the scope of the invention described and/or claimed herein.

EXAMPLES

Materials Used

In the Examples below, melt flow rate (MFR) refers to melt flow as determined according to ASTM D1238 at 190° C. using a 2160 g weight, with values of MFR reported in g/10 minutes.
PLA-1 is a poly(lactic acid) with a melting point (MP) of about 150+/−2° C. available as NATUREWORKS LLC 2002D and a TG of about 59+/−1° C. as measured by differential scanning calorimetry (DSC) at the heat-up rate of 10° C./minute using a sample that has less than 5 J/g of crystallinity.
.PLA-2 is a poly(lactic acid) with a MP of about 168° C. available as NATUREWORKS LLC 4032D and a TG of about 60+/−1° C.
POM-1 is a POM having MP of 168° C. and MFR of 9.
POM-2 is a POM having MP of 178° C. and MFR of 2.3.
POM-3 is a high molecular weight POM having MP of 178° C. and MFR of 0.3.
POM-4 is a POM having MP of 178° C. and MFR of 37.

In Table 1 below, the compositions were compounded using a 55-g Haake batch mixer (Thermo Haake GmbH., Dieselstraβe 4, D-76227 Karlsruhe, Germany) set at 190° C., 125 rpm, for about 2 minutes. The quantities of modifier in Table 1 are listed in weight % based on the total weight of the composition.

TABLE 1

| Example | Poly(lactic) Acid | Modifier | Weight % |
|---|---|---|---|
| C1 | PLA-1 | None | 0 |
| 2 | PLA-1 | POM-1 | 0.6 |

TABLE 1-continued

| Example | Poly(lactic) Acid | Modifier | Weight % |
|---|---|---|---|
| 3 | PLA-1 | POM-1 | 1 |
| 4 | PLA-1 | POM-1 | 2 |
| 5 | PLA-1 | POM-1 | 4 |
| 6 | PLA-1 | POM-1 | 8 |
| 7 | PLA-1 | POM-2 | 1 |
| 8 | PLA-1 | POM-3 | 1 |
| 9 | PLA-1 | POM-4 | 1 |
| C10 | PLA-2 | None | 0 |
| 11 | PLA-2 | POM-1 | 2 |
| 12 | PLA-2 | POM-1 | 4 |

Samples were assayed using DSC by heating (from ambient) to 220° C. at 10° C./minute, cooling to ambient at 10° C./minute and heating a second time to 220° C. at 10° C./minute. In Table 2, energy unit was J/g and temperature unit was ° C.

TABLE 2

| Example | Observed cool down crystal exotherm energy | Tg during 2nd heat-up Temperature | Cool down crystallization temperature | Second heat-up crystallization exotherm Energy | Heat-up crystallization temperature | Observed melting energy endotherm |
|---|---|---|---|---|---|---|
| C1 | 0 | 60 | none | 0 | none | 0 |
| 2 | 0 | 60 | none | 5.7 | 130 | 6.6 |
| 3 | 0 | 59 | none | 14.7 | 127 | 17 |
| 4 | 0 | 59 | none | 25 | 120 | 34 |
| 5 | 8 | 61 | 111 | 20 | 124 | 28 +/− 3 |
| 6 | 16 | 61 | 121 | 12 | 129 | 24 +/− 6 |
| 7 | 0 | 59 | none | 12.6 | 129 | 11 |
| 8 | 0 | 59 | none | 12 | 129 | 12 |
| 9 | 0 | 59 | none | 12 | 129 | 12 |
| C10 | 0 | 60 | none | 0 | none | 4 |
| 11 | 0.5 | 59 | 95 | 41 | 101 | 47 |
| 12 | 40 | 59 | 110 | 2 | 102 | 48 |

Higher values for cool-down crystallization exotherm indicated a greater practical difficulty in making thick amorphous sheets of PLA. That is, high values meant that a PLA melt that was being quenched into an amorphous sheet might experience partial crystallization during the quenching process. If the pre-thermoformed sheet of PLA was partly crystalline, then the sheet might thermoform poorly. For example, a partly crystalline sheet may not fully form into an article unless heated to a higher temperature. Higher values for second heat crystallization exotherms indicated a trend toward greater extent of full crystallization for unoriented or slightly oriented parts of a thermoformed article during the heat history for the thermoforming process. Low values indicated that unoriented or slightly oriented portions of a thermoformed article may remain amorphous and be susceptible to dimensional instability if heated for a period of time above the Tg of the PLA. Furthermore, a reduction of the Tg of the PLA in any blend may be undesirable because weakening of mechanical properties of semi-crystalline polymers such as PLA accelerated when temperatures rose above the Tg (e.g., a lowering of modulus). Very high values of the second heat crystallization exotherm, or high values for the sum of the cool-down and heat-up exotherms, indicated poor thermoformabililty due to crystallization too early during the forming process. Such crystallization, if only slight, might impart haze on the article. Higher levels of crystallization may retard the full thermoforming of the article. High second-heat melting endotherms indicated a combination of fast crystallization during cool-down and during heat-up. Low values for the melting energy endotherm suggested that thermoformed articles would likely be dimensionally unstable if heated for a time above the Tg of the particular PLA used.

Of note were PLA compositions comprising PHA (e.g., PLA) and POM with cool-down crystallization energy less than 5 J/g, where cool-down crystallization energy was determined by DSC disclosed above. Also of note were such compositions comprising PHA (e.g., PLA) and POM with melting energy greater than 10 J/g, or greater than 15 J/g, where melting energy was determined in the second heating portion of the cycle by DSC disclosed above.

For PLA-1, inclusion of less than about 2 weight % of POM-1 provided the best combination of low cool-down crystallization energy and melting energy properties, indicating that compositions with POM-1 in that range were desirable for successful thermoforming.

Compounding and Sheet Formation

The compositions of Comparative Example C13 and Examples 14 through 16 were prepared by compounding in a 28 mm tri-lobal co-rotating Werner & Pfleiderer twin screw extruder with a screw design 835 mm long with all conveying segments and comprising two hard working segments (15 mm of a kneading block and 8 mm of a left-hand (reverse) conveying section) followed by a 8-inch wide sheeting die set. The materials were fed as a pellet blend, with the extruder barrels set at 190° C. and the screws rotating at 125 rpm. The molten compositions were cast onto a quench drum cooled with water (temperature about 22° C.) to provide 22- to 26-mil thick amorphous sheets. The compositions prepared are summarized in Table 3.

TABLE 3

| Example | Poly(lactic) Acid | Additive | Weight % |
|---|---|---|---|
| C13 | PLA-1 | None | 0 |
| 14 | PLA-1 | POM-1 | 0.5 |
| 15 | POM-1 | POM-1 | 1 |
| 16 | PLA-1 | POM-1 | 2.1 |

Stretch Testing

Portions of thermoformed articles were oriented. That is, polymer molecules were aligned in the direction of the greatest stretch, which was the depth direction for thermoformed cups having a higher depth than diameter. Orientation helped crystallization speed and subsequently helped improve dimensional stability of the articles above the Tg of the PLA. Stretch testing could be used to simulate the stretching or orientation that occurred during thermoforming, such as that occurring in the wall portions of a cup. The behavior of these uniaxially stretched sheets was predictors of the behavior of the wall portion of thermoformed cups, which was also uniaxially oriented.

Strips of the sheets from Table 3 (2 cm widths) were marked with tick-marks 1 cm apart along length of strip. The strips were held with hemostats to provide a 5-cm stretch gap between hemostats. The strips were heated in a pan of boiling water for 5 seconds at zero tension, stretched in a 1- to 2-second period up to about four-fold, held for a specified time for heat-setting, then removed and immediately cooled in water to about 23° C. The distance between tick marks was measured to determine the actual stretch ratio to 2 significant digits (for example, "0.8×" means the original tick mark spacing was 1.0 cm and the final tick mark spacing was 1.8 cm) in the region where the stretch appeared uniform (for example, if it was 1× in the middle 75% of the strip but 0.7× in outer 25%) near the hemostats the stretch was recorded as "1×"). New tick marks were marked on the strip where it had been uniformly stretched. The dimensional stability of the strip was determined by plunging the sheet for 30 seconds into boiling water with no tension, then immediately cooling in 23° C. water. The shrinkage was determined by comparing the total distance of the pre-shrinkage tick-marks ($D_o$) to the total distance of the post-shrinkage tick-marks ($D_n$) using the following formula:

% Shrinkage=$100\times(D_o-D_n)/D_n$

For example, if the pre-shrinkage tick marks totaled to 4 cm and post-shrinkage distance totaled to 3 cm, then 100×(4−3)/3=33% shrinkage). The results are summarized in Table 4, where the stretch ratios and % shrinkage are reported as the average of the number of replicates for each stretching condition.

TABLE 4

| Example | Composition | Heat setting time in seconds (replicates) | Original Stretch Ratio | Stretch Ratio after exposure to 100° C. | % Shrinkage |
|---|---|---|---|---|---|
| C17 | C13 | 5 (4) | 3.3 | 2.8 | 17 |
| C18 | C13 | 10 (2) | 3.2 | 3.0 | 6 |
| C19 | C13 | 20 (1) | 5.1 | 5 | 2 |
| 20 | 14 | 5 (5) | 3.7 | 3.2 | 13 |
| 21 | 14 | 10 (4) | 3.4 | 3.0 | 10 |
| 22 | 14 | 20 (2) | 3.2 | 3.2 | 0 |
| 23 | 15 | 5 (5) | 3.4 | 3.3 | 4.6 |
| 24 | 15 | 10 (2) | 3.2 | 3.2 | 0 |
| 25 | 16 | 5 (4) | 3.2 | 3.18 | 0.5 |
| 26 | 16 | 20 (1) | 3.5 | 3.5 | 0 |

Table 4 indicates that the uniaxially oriented sheets of nonmodified PLA may have significant shrinkage after orientation with short "heat setting" times. They could exhibit improved dimensional stability (i.e., low shrinkage) if held for a longer time under tension at the orientation temperature. When a PLA-POM composition was used, the amount of shrinkage was significantly reduced even with low heat-set times. The duration of heat setting necessary for low shrinkage was reduced, thereby providing a lowered cycle-time for the thermoforming process. Improved dimensional stability was observed even at levels of 0.5 weight % of POM.

Sheets (about 21 to 25-mil thick) of amorphous compositions listed in Table 5 were stretched by exposure to 100° C. water for 10 seconds and stretched in about 2 seconds.

TABLE 5

| Composition | PLA-1 (weight %) | POM-1 (weight %) |
|---|---|---|
| C27 | 100 | 0 |
| 28 | 98 | 2 |

For a 2× ratio, the original length was 2.25 inches which was stretched to about 4.5 inches. For a 4× ratio, the original length was 1.1 inches stretched to about 4.5 inches. After stretching, the samples were immediately plunged into water at about 23° C. The actual stretch ratio was measured using changes in tick mark locations (1-cm tick marks on the original sheets were used to quantify the actual stretch ratio along the strip). The oriented or stretched strip was given new 1-cm stretch marks. The marked stretched strip was put into boiling water or water at 71° C. Similarly, the strips were put into an air oven at 60° C. (10 seconds) to monitor any shrinkage. The percent shrinkage is summarized in Table 6. If more than one replicate for a test was used, the shrinkage was average of the replicates shown in parentheses.

TABLE 6

| | | Shrinkage % | | |
|---|---|---|---|---|
| Composition | Stretch ratio | 100° C. | 71° C. | 60° C. |
| C27 | 1.5 | — | 10 (2) | — |
| | 2 | 30 (3) | 30 (3) | 10.0(3) |
| | 2.3 | 40 | — | — |
| | 2.7 | 50 | — | 18.6 |
| | 3 | — | 39.6 (2) | 27.0 |
| | 3.6 | — | — | 20.0 |
| | 4 | 60 (3) | — | — |
| | 4.5 | — | — | 30.0 |
| | 4.7 | — | — | 33.0 |
| | 5 | — | 52.5 | — |
| | 6 | — | 52.5 | — |
| 28 | 2 | 30 (4) | 20 (3) | 1.7(3) |
| | 3 | 40 | — | — |
| | 3.1 | 40 | 20 | 0 |
| | 3.3 | 40 | — | 0 |
| | 4 | 40 (2) | 20 | 5.0 |
| | 4.6 | 40 | — | — |

Table 6 shows that shrinkage increased with higher exposure temperature and with higher stretch ratios (for the conditions of this orientation procedure). Modifying PLA with POM reduced shrinkage at all stretch ratios up to 5 to 6× and for temperature ranged from 60 to 100° C.

The same orientation process as above (orientation in 100° C. water to a 2× stretch ratio) was used, but the sheet was held in the water for 6 seconds to partially heat set the composition. Shrinkage was tested by immersion for 10 seconds in near-boiling water, 80° C. water, and for 1 hour at about 70° C. in an oven. The results are summarized in Table 7.

TABLE 7

| | Shrinkage % | | |
|---|---|---|---|
| Composition | 98 to 100° C. | 80° C. | 70 to 71° C. |
| C27 | 35 | — | 30 |
| C27 (partial heat set) | 25 | 12 | 17 |
| 28 | 30 | — | 20 |
| 28 (partial heat set) | 15 | 10 | 7 |

Table 7 shows that slight annealing under tension (heat setting for about 6 seconds) improved the dimensional stability of oriented PLA articles, both neat and especially those modified with POM.

Additional sheets with differing amounts of POM-1 were cut into 1-inch wide strips 2.25 inches in length. The strips were oriented using a procedure similar to that described above (20 seconds in water at about 95-98° C., 2× stretch over 2 seconds, 4 second hold at 95-98° C. under tension, then quenched at 22° C.). The samples were allowed to shrink at 70° C. for 1 hour in an oven under no tension. The results are summarized in Table 8. As in previous experiments, shrinkage was improved when the PLA was modified with POM.

TABLE 8

| Example | % POM-1 | Length before shrink | Length after shrink | % Shrinkage |
|---|---|---|---|---|
| 29 | 2 | 7 | 6.3 | 10 |
| 30 | 1 | 8 | 6.6 | 18 |
| 31 | 0.5 | 7 | 5.4 | 23 |
| C32 | 0 | 7 | 5.4 | 23 |

Thermoforming Protocol

A thermoforming apparatus comprising a wooden frame about 9 inches high was prepared. The apparatus had three plies of 0.75-inch-thick wood stacked at the bottom. The bottom two plies each had one 2-inch diameter hole drilled through and the third had one 2.25-inch diameter hole drilled through. A fourth wooden ply mounted about 6.5 inches above the third ply had one 2-inch diameter hole drilled through. The plies were arranged in the apparatus so that the centers of the holes were vertically aligned. When used for thermoforming, a thermoplastic test sheet was placed between the third ply and the bottom plies. Additional wooden pieces were used to hold the plies and the sheet tightly in place during thermoforming. An aluminum plunger, 1.5 inches in diameter, was inserted through the upper holes so that it contacted the upper face of the sheet. Downward pressure on the plunger during thermoforming forces the sheet into the cavity formed by the holes in the bottom plies, thereby forming a cup-shaped article.

Prior to the thermoforming operation, the plunger and the apparatus were heated in boiling water so that they were pre-heated to 100° C. The apparatus was briefly removed from the boiling water, a test sheet was mounted in the apparatus and the apparatus was returned to the boiling water bath within 15 seconds. After ensuring that boiling water filled the inside of the mold cavity, boiling water was squirted on the upper face of the sheet to heat the sheet prior to forming. After a given recorded preheat time, the apparatus was removed from the boiling water bath and the plunger was inserted into the holes and force applied to form the sheet into a cup-shaped article. The plunger was held in the down position and the entire apparatus was immediately immersed in ambient temperature water (about 23° C.) to quench the formed cup. Once the apparatus was completely immersed, the plunger was removed and water circulated throughout the apparatus and cup until the cup has been cooled to at least below 40° C. The cup was then removed from the apparatus.

Table 9 summarizes some thermoforming runs with varied preheat and forming times using sheets comprising a composition of 98 wt % of PLA-1 and 2 wt % of POM-1. The sheets were prepared as described above. The plunger was relatively free to move after thermoforming and the cups seemed to have shrunk during the water quench. The thermoforming took the cups to the full 1.5-inch draw but the cup dimensions after quenching were less in length. Clarity (haze) after forming was judged qualitatively by observing through the bottom of the cup printed material 1.5 inches away from the bottom. Time was measured at seconds.

TABLE 9

| Example | Preheat Time | Thermoforming Time | Quench | Clarity after Forming |
|---|---|---|---|---|
| 33 | 20 | 0.5 | fast | transparent |
| 34 | 20 | 3 | fast | transparent |
| 35 | 60 | 6 | fast | translucent |
| 36 | 60 | 0.5 | fast | opaque |

Example cups were heated, open end up, in an oven at about 60° C. for 1 hour, with the following results.

33 diameter of base was about 20% smaller.

34 slight wall deformation and base deformation.

35 slight base deformation.

36 negligible deformations.

These results show that for a PLA-POM composition a thermoforming window based on an optimal preheat duration and thermoforming speed exists to achieve both low dimensional shrinkage and good optical clarity for the thermoformed article.

Sections of the walls of the cups were cut away and immersed in 82° C. (a temperature considerably higher than the Tg) water for five seconds under no tension. The results are summarized in Table 10.

TABLE 10

| | Example | 33 | 34 | 35 | 36 |
|---|---|---|---|---|---|
| Dimensions of original thermoformed cup | Diameter at base (inch) | 1.5 | 1.5 | 1.5 | 1.5 |
| | Height of wall (inch) | 1.00 | 1.40 | 1.25 | 1.25 |
| Thickness of sheet before thermoforming (mil) | Original Sheet | 25 | 21 | 21 | 24 |
| Thickness of cup after thermoforming (mil) | Base | 16 | 16 | 18 | 15 |
| | Wall contacting plunger | 6.0 | 4.5 | 18 | 6.0 |
| | Wall not contacting plunger | 9.0 | 15.0 | 7.0 | 17.0 |
| Distance between 0.5 cm tick marks after immersion | MD (length) | 0.47 | 0.48 | 0.40 | 0.50 |
| | TD (circumference) | 0.50 | 0.50 | 0.50 | 0.50 |

The results in Table 10 show quantitatively that cups could be made with walls having improved dimensional stability even at temperatures well above the Tg of the PLA (Example 36).

Cups of Examples 37-39 and C40, with the amount of POM-1 varied, were formed under fixed conditions (30-second preheat and forming in less than 3 seconds, followed by immediate quench) that had given good clarity above (Example 34). All the samples were relatively transparent, meaning that print could be easily read through the 15 to 18-mil thickness of the base of the cups when that print was 1.5-inches away from the base. Their lengths or heights were all close to the original 1.5-inch length of the mold because the plunger was more securely held in fixed position when the apparatus was being plunged into cool water.

The bottom 1 cm of the wall of each cup was cut into 1 cm by 1 cm squares and two squares were laid together at 150° F. (52° C.) for 5 minutes under a pressure of about 6 psi. Squares of Examples 37 and C40 did not stick to themselves. Similar squares were cut from the unformed part of the sheets. The unformed sheet from Example 37 did not stick, while the unformed sheet from C40 stuck together but could be pulled apart. Under these conditions, sheets of amorphous PLA-1 lock-stick together. These results indicate the value of the PLA-POM composition in minimizing lock-sticking of the tops or bases of thermoformed PLA cups when stacked cups were exposed to high temperatures (for example, during shipping).

Table 11 summarizes the results of shrink-testing the thermoformed cups by immersion in 82° C. water for five seconds. In Table 11, the volume was determined by the amount of water that filled the cup to its brim, both before and after shrinkage.

TABLE 11

| | Example | 37 | 38 | 39 | C40 |
|---|---|---|---|---|---|
| | PLA-1 (weight %) | 98 | 99 | 99.5 | 100 |
| | POM-1 (weight %) | 2 | 1 | 0.5 | 0 |
| Dimensions Before | Diameter (inch) | 1.5 | 1.5 | 1.5 | 1.5 |
| Immersion in 82° C. | Length (inch) | 1.4 | 1.4 | 1.4 | 1.4 |
| water for Five Seconds | Volume (cc) | 47 | 44 | 40 | 45 |
| Volume After Immersion (cc) | | 28 | 28 | 31 | 24 |
| % volume shrinkage | | 40 | 36 | 23 | 47 |

Cups were thermoformed using the apparatus described above and the following parameters:

The apparatus was heated in a water bath at about 100° C. (it was usually from 93 to 98° C.), the sample was held in the heated water for 20 seconds before forming with a metal plunger heated to 100° C. While the sheet was still under water, the cup was formed in 2 seconds and held with the plunger in place for 10 seconds for heat setting or annealing, then quenched in 22° C. water.

The wall of the cup prepared from 100% PLA-1 using the above process did not shrink when the cup was filled with 80 to 100° C. water. This result shows the value of heat setting to give high dimensional stability, when compared with C40, which had negligible heat set time.

Additional cups comprising 100% PLA-1 or PLA-1 modified with 2 weight % POM-1 were formed using very nearly the same procedure as directly above, except at lower forming temperatures.

The cups from forming at the slightly lowered bath temperature (about 92-95° C.) were transparent. These cups were placed in an air oven set at 70° C. for 1 hour. Both nonmodified and POM-modified cups deformed, although the POM-modified cup had slightly less deformation.

Cups formed at a slightly higher bath temperature (about 95-98° C.) were not transparent. The walls of the cups were 8-9 mils thick, which indicated considerable orientation from the original 21 to 25 mil thickness. The cups were filled with 70° C. water and a 62-gram weight was placed on top. The cup of non-modified PLA-1 collapsed from its 1.5-inch height to about 0.25 inch, but the cup of PLA-1 modified with 2 weight % POM-1 did not collapse.

From these experiments, thermal instability of cups prepared from PLA-1 appears to be due to poor dimensional stability of its base and rim, both of which are lightly oriented and rapidly quenched. Modification of PLA-1 with POM-1 improves by about two-fold the dimensional stability for such lightly oriented, rapidly quenched PLA compositions, representing the base of a formed cup.

Cooler forming temperatures, e.g., 92° C. and especially 85° C., provided cups with better transparency. However, when 70° C. water was poured into these cups, they shrunk by about 50%. Without being held to any particular theory, it appears that 95-105° C. molding temperature may be needed to allow crystallinity to form in the oriented wall of the cups.

Compositions of PLA-1 with varied amounts of POM-1 were compounded and made into 26 to 32 mil-thick amorphous sheets using conditions similar to those used to prepare Examples C13 through 16, except chilled water was used to cool the quench drum to about 11° C.

The amorphous sheets were cut into 23-cm squares. The sheet was applied in a horizontal position to a laboratory thermoformer (LABFORM® Model 1620 from Hydrotrim Corp., W. Nyack, N.Y., USA) for testing thermoformability in a batch-mode. Heat was applied from a 230° C. black-body radiator from above and below the sheet during a 45-second dwell time, during which time the surface temperature of the sheet rose toward the nominal forming temperature of about 90° C. The mold was an unheated, uncooled ceramic mold to provide a shaped article that simulates a pet-food can with 4-cm depth and 8-cm diameter. At the end of the heat cycle the sheet was immediately positioned over the mold and clamped to the mold perimeter. Vacuum from within the mold during about 2 seconds drew the sheet into the mold. The molded sheet was cooled in the mold and then ejected after about 15 seconds. The sheet had completely reproduced the inside shape of the mold. The molded cups had these dimensions: wall thickness about 11 to 13 mils and base thickness about 10 to 13 mils. Haze of the formed cups was measured using ASTM D1003-REV92 on the base of the cup. Sample cups were then filled with 60° C. water to their brims to assess shrinkage and their dimensions measured. The results are summarized in Table 12.

TABLE 12

| | | Cup Height (inches) | | |
|---|---|---|---|---|
| Example % | POM-1 | Before heat exposure | After heat exposure | Haze Value |
| C41 | 0 | 1.43 | 1.12 | 1.8 |
| 42 | 2 | 1.44 | 1.43 | 1.8 |
| 43 | 4 | — | — | 2.7 |
| 44 | 5 | — | — | 4.0 |

Table 12 shows that unmodified PLA-1 has good (low) haze but poor heat resistance (Comparative Example C41). Example 42 provided haze equal to that of C41, but with better heat resistance. This shows the value of the PLA-POM composition for providing the combination of low haze and temperature resistance. Higher levels of POM-1 provided higher haze under these conditions (Examples 43 and 44).

Of note are thermoformed or oriented articles having less than 5%), preferably less than 2%, haze, measured at 10 to 13 mil thickness using ASTM D1003-REV92. Also of note are thermoformed or oriented articles having less than 10% shrinkage when heated to 60° C. for at least 2 seconds.

In separate runs, compositions were made using PLA200D and various POMs shown in Tables 13-14 below to produce compounded compositions containing different weight % of POM shown in the tables, using a Haake mixer and were prepared as disclosed above in Table 1. The compounded compositions were assayed using DSC by heating (from ambient) to 220° C. at 10° C./minute, cooling to ambient at 10° C./minute and heating a second time to 220° C. at 10° C./minute. In Table 13, a PLA composition was "amorphous" if the composition, when heated in a the DSC from ambient to 25° C. above its melting point at about 10° C./minute, showed less than about 1 J/g when the melting endotherm "J/g" was subtracted by the crystallization exotherm "J/g". A fast crystallizing PLA composition was one that when amorphous and was heated in the DSC developed >1 J/g in the crystallization exotherm and especially >20 J/g.

In Tables 13-14, "1st exo" (exotherm) is the area under the crystallization exotherm when plotting "heat flow" versus increasingly high temperature; "xal" temperature denotes temperature at which there was the highest exothermic heat flow (at the 10° C./minute heating rate used), that is the crystallization temperature during the heating of the amorphous sample; the "$1^{st}$ endo" (endotherm) is the area under the melting endotherm when plotting "heat flow" versus increasingly high temperature; the melt temperature is the temperature of maximum heat flow associated with the melting endotherm and was 152° C. for PLA-1); "$2^{nd}$ exo" is the area under the crystallization exotherm that occurred after the sample had first been heated to 200° C., 200° C., or 250° C. and cooled to ambient, the "max temp" is the temperature for maximum heat flow of the $2^{nd}$ exotherm; "$2^{nd}$ endo" is the melting point of the sample when it is melted during the second heat-up cycle. The second cycle is used because it eliminates heat history for the original samples such as an annealing effect from being stored for very long times at slightly elevated temperatures. Higher values for cool-down crystallization endotherm indicate that a PLA melt that was being quenched into an amorphous sheet might experience partial crystallization during the quenching process. If the pre-thermoformed sheet of PLA was partly crystalline, then the sheet may thermoform poorly (a partly crystalline sheet may not fully form into an article unless heated to a higher temperature). Higher values for second heat crystallization exotherms indicate a trend toward greater extent of full crystallization for unoriented or slightly oriented parts of a thermoformed article during the heating history for the thermoforming process. Low values indicate that unoriented or slightly oriented portions of a thermoformed article may remain amorphous and be susceptible to dimensional instability if heated for a period of time above the Tg of the PLA. Very high values of the second heat crystallization exotherm, or high values for the sum of the cool-down and heat-up exotherms, indicate poor thermoformability due to crystallization during the forming process, before the flat sheet completely fills the thermoforming mold. Such crystallization, if only slight, may impart haze on the article. High second-heat melting endotherms indicate a combination of fast crystallization during cool-down and during heat-up.

TABLE 13

| Exam[1] | POM (wt %) | $1^{st}$ exo J/g | xal temp | $1^{st}$ endo J/g | $2^{nd}$ exo (J/g) | xal temp | $2^{nd}$ endo (J/g) |
|---|---|---|---|---|---|---|---|
| 51 | POM-2 (1) | 24 | 122 | 30 | 13 | 129 | 11 |
| 52 | POM-1 (2) | 25 | 120 | 34 | | | |
| 53 | POM-2 (1) | 24 | 121 | 32 | 12 | 129 | 12 |
| 54 | POM-4 (1) | 25 | 121 | 30 | 12 | 129 | 12 |
| 55 | POM-1 (1) | 0 | | 5 | | | |
| 56 | POM-1 (0.6) | 16 | 128 | 17 | 6 | 131 | 7 |
| 57 | POM-1 (0.6) | 0 | | 3 | 0 | | 1 |
| 58 | POM-1 (1) | 21 | 122 | 27 | 15 | 127 | 17 |
| 59 | POM-1 (2) | 8 | 110 | 24 | 6 | | 15 |
| 60 | POM-1 (4) | 24 | 106 | 38 | 20 | 124 | 31 |
| 61 | POM-1 (4) | 16 | 127 | 28 | 8 | 131 | 19 |
| 62 | POM-1 (8) | 16 | 123 | 36 | 0 | | 17 |
| 63 | POM-1 (8) | 20 | 106 | 42 | 12 | 129 | 31 |

[1]All temperatures were in ° C.
Max DSC heat temperature was 200 for Examples 51-54 and 63; 220 for Examples 55, 57, 59, and 61-62; and 250 for Examples 56 and 58.
All cool down crystallization (J/g) was 0 except Examples 60 and 63 that were 8 (cool down crystalline temperature was 111° C.) and 16 (cool down crystalline temperature was 121° C.), respectively.

Compositions were also made by melt blending using a 30 mm W&P extruder at a feed rate of 20 lb/hr, 190° C. set point, a flat sheeting die, and a cool (18-27° C.) quench drum to produce 22-27 mil sheets. DSC results are shown in Table 14.

TABLE 14

| Exam[1] | POM (wt %) | $1^{st}$ exo | xal temp | $1^{st}$ endo | Crsyt temp[2] | $2^{nd}$ exo | xal temp | $2^{nd}$ endo |
|---|---|---|---|---|---|---|---|---|
| 71 | POM-1 (2) | 22 | 111 | 25 | 0 | 15 | | 14 |
| 72 | POM-4 (4) | 24 | 112 | 23 | 0 | 20 | | 21 |
| 73 | POM-2 (6) | 23 | 112 | 24 | 0 | 21 | | 23 |
| 74 | POM-2 (6) | 23 | 112 | 23 | 0 | 21 | | 24 |
| 75 | POM-1 (4) | 23 | 110 | 35 | 10 | 23 | 120 | 26 |
| 76 | POM-1 (2) | 24 | 113 | 30 | 0 | 14 | 125 | 20 |
| 77 | POM-1 (2) | 24 | 112 | 29 | 0 | 14 | 125 | 20 |
| 78 | POM-1 (5) | 23 | 110 | 36 | 7 | 18 | 126 | 26 |
| 79 | POM-1 (5) | 23 | 110 | 35 | 7 | 18 | 126 | 26 |
| 80 | POM-1 (5) | 25 | 108 | 33 | 6 | 21 | 120 | 29 |
| 81 | POM-1 (4) | 23 | 110 | 35 | 10 | 17 | 120 | 26 |
| 82 | POM-1 (10) | 23 | 111 | 42 | 15 | 14 | | 28 |

[1]All temperatures were in ° C.
Max DSC heat temperature was 250.
All cool down crystalline (J/g) was 0 except Examples 75 (10; cool down crystalline temperature 104° C.), 78 (7; cool down crystalline temperature 109° C.), 79 (7; cool down crystalline temperature was 109° C.), 80 (6; cool down crystalline temperature was 108° C.), and 81 (10; cool down crystalline temperature was 104° C.).
[2]Cool down crystallization temperatures.

The data shown in Tables 2 and 13-14 were further analyzed as shown in the FIGURE, in which the total crystallinity in the second heat-up is plotted against the amount of POM additives (○ represents data obtained from POM-1; Δ represents data obtained from POM-2; and ◇ represents data obtained from POM-4). The FIGURE shows that the crystallinity increased steadily until it leveled off at about 8-9 weight % of POM in the composition.

The invention claimed is:

1. An article comprising a composition wherein
the composition comprises or is produced from poly(hydroxyalkanoic acid) and 0.1 to 0.9 weight % of a polyoxymethylene, based on the total amount of the composition; and
the article is a thermoformed article.

2. The article of claim 1 wherein the article is optically transparent and the poly(hydroxyalkanoic acid) comprises hydroxyalkanoic acids having five or fewer carbon atoms.

3. The article of claim 2 wherein
the poly(hydroxyalkanoic acid) comprises glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, or combinations of two or more thereof;
the article has less than 5% haze, measured with 10 to 13 mil film or sheet using ASTM D1003-REV92; and
the article has less than 15% shrinkage when the article is heated to 60° C. for at least 2 seconds.

4. The article of claim 3 wherein
the poly(hydroxyalkanoic acid) comprises poly(glycolic acid, poly(lactic acid), polyhydroxy-butyric acid, polyhydroxybutyrate-hydroxyvalerate copolymer, copolymer of glycolic acid and lactic acid, or combinations of two or more thereof;
the article has less than 3% haze; and
the article has less than 10% shrinkage when the article is heated to 60° C. for at least 2 seconds.

5. The article of claim 1 wherein the poly(hydroxyalkanoic acid) is poly(lactic acid).

6. The article of claim 4 wherein the poly(hydroxyalkanoic acid) is poly(lactic acid).

7. The article of claim 6 having less than 2% haze.

8. The article of claim 1 wherein the composition has cool-down crystallization energy less than 5 J/g, where cool-down crystallization energy is determined by differential scanning calorimetry by heating a sample of the composition from ambient temperature to 220° C. at 10° C./minute and cooling to ambient temperature at 10° C./minute.

9. The article of claim 8 wherein
the poly(hydroxyalkanoic acid) comprises hydroxyalkanoic acids having five or fewer carbon atoms;
the article is oriented;
the article has less than 5% haze, measured with 10 to 13 mil film or sheet using ASTM D1003-REV92; and
the article has less than 15% shrinkage when the article is heated to 60° C. for at least 2 seconds.

10. The article of claim 9 wherein
the poly(hydroxyalkanoic acid) comprises poly(glycolic acid, poly(lactic acid), polyhydroxy-butyric acid, polyhydroxybutyrate-hydroxyvalerate copolymer, copolymer of glycolic acid and lactic acid, or combinations of two or more thereof;
the article has less than 3% haze; and
the article has less than 10% shrinkage when the article is heated to 60° C. for at least 2 seconds.

11. The article of claim 10 wherein the composition comprises from 0.1 to 0.9 weight % of the polyoxymethylene resin.

12. The article of claim 10 wherein the poly(hydroxyalkanoic acid) is poly(lactic acid).

13. The article of claim 11 wherein the poly(hydroxyalkanoic acid) is poly(lactic acid) and the article has less than 2% haze.

14. A poly(hydroxyalkanoic acid) composition comprising (i) poly(hydroxyalkanoic acid) and (ii) from 0.1 to 0.9 weight % of a polyoxymethylene resin.

15. The composition of claim 14 wherein the poly(hydroxyalkanoic acid) comprises 6-hydroxyhexanoic acid, 3-hydroxyhexanoic acid, 4-hydroxyhexanoic acid 3-hydroxyheptanoic acid, or combinations of two or more thereof and the composition has a glass transition temperature that is within 3% of the glass transition temperature of the poly(hydroxyalkanoic acid).

16. The composition of claim 15 wherein the poly(hydroxyalkanoic acid) is poly(lactic acid) and the composition has cool-down crystallization energy less than 5 J/g, where cool-down crystallization energy is determined by differential scanning calorimetry by heating a sample of the composition from ambient temperature to 220° C. at 10° C./minute and cooling to ambient temperature at 10° C./minute.

17. A process comprising compounding a composition to produce a compounded composition; producing a film or sheet from the composition; and thermoforming the film or sheet in a mold at a thermoforming temperature effective to form a shaped article wherein
the composition comprises or is produced from poly(hydroxyalkanoic acid) and 0.1 to 9 weight % of a polyoxymethylene, based on the total amount of the composition;
the article is thermoformed article; and
the composition has a glass transition temperature that is within 5% of the glass transition temperature of the poly(hydroxyalkanoic acid).

18. The process of claim 17 wherein
the poly(hydroxyalkanoic acid) is polylactic acid;
the composition comprises or is produced from poly(hydroxyalkanoic acid) and 0.1 to 0.9 weight % of the polyoxymethylene;
the film or sheet, before the thermoforming, is preheated for 5 to 200 seconds;
the thermoforming temperature is 90 to 200° C.;
the thermoforming is carried out for a period of 0.1 to 20 seconds; and
the process further comprises quenching the article to a temperature of about 50° C.

19. The process of claim 18 wherein
the film or sheet is preheated for 20 to 60 seconds;
the thermoforming temperature is at about the midpoint between the Tg and the melt point of the polylactic acid;
the thermoforming is carried out for a period of 0.5 to 6 seconds; and
the quenching is carried out in less than 5 minutes.

* * * * *